US012664083B2

(12) United States Patent
Kim et al.

(10) Patent No.: US 12,664,083 B2
(45) Date of Patent: Jun. 23, 2026

(54) MEMORY SYSTEM AND OPERATING METHOD OF A CONTROLLER OF THE MEMORY SYSTEM

(71) Applicant: SK hynix Inc., Icheon-si (KR)

(72) Inventors: Jin Woo Kim, Icheon-si (KR); Jin Woong Kim, Icheon-si (KR); Ik Sung Oh, Icheon-si (KR); Hui Jae Yu, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 253 days.

(21) Appl. No.: 17/958,670

(22) Filed: Oct. 3, 2022

(65) Prior Publication Data

US 2023/0305952 A1     Sep. 28, 2023

(30) Foreign Application Priority Data

Mar. 23, 2022     (KR) ........................ 10-2022-0036096

(51) Int. Cl.
*G06F 12/02*            (2006.01)

(52) U.S. Cl.
CPC .. *G06F 12/0246* (2013.01); *G06F 2212/1016* (2013.01); *G06F 2212/7211* (2013.01)

(58) Field of Classification Search
CPC ......... G06F 12/0246; G06F 2212/1016; G06F 2212/7211; G06F 2212/1024; G06F 2212/1036; G06F 3/0616; G06F 3/0652; G06F 3/0653; G06F 3/0658
See application file for complete search history.

(56) References Cited

U.S. PATENT DOCUMENTS

| | | | | |
|---|---|---|---|---|
| 2009/0198869 A1* | 8/2009 | Mosek | ................ | G06F 12/0246 |
| | | | | 711/E12.008 |
| 2016/0276033 A1* | 9/2016 | Cha | ....................... | G11C 29/021 |
| 2017/0186494 A1* | 6/2017 | Kim | ....................... | G11C 16/10 |
| 2018/0188980 A1* | 7/2018 | Tai | ....................... | G06F 12/0246 |
| 2020/0210093 A1 | 7/2020 | Lin et al. | | |
| 2021/0096756 A1 | 4/2021 | Rajgopal et al. | | |
| 2021/0247933 A1* | 8/2021 | Shin | ........................ | G06F 3/064 |
| 2023/0028627 A1* | 1/2023 | Bhardwaj | ............. | G06F 3/0659 |

FOREIGN PATENT DOCUMENTS

KR     1020200033461 A     3/2020

* cited by examiner

*Primary Examiner* — Prasith Thammavong
*Assistant Examiner* — Han V Doan
(74) *Attorney, Agent, or Firm* — WILLIAM PARK AND ASSOCIATES LTD.

(57)     ABSTRACT

A memory system includes memory blocks and a controller. The controller configured to perform a wear levelling operation on the memory blocks based on a reference count table and an erase count table.

17 Claims, 7 Drawing Sheets

ECT

| | EC |
|---|---|
| MB1 | 50 |
| MB2 | 180 |
| ⋮ | ⋮ |
| MBn | 100 |

RCT

| | RC |
|---|---|
| MB1 | 100 |
| MB2 | 120 |
| ⋮ | ⋮ |
| MBn | 95 |

FIG. 4

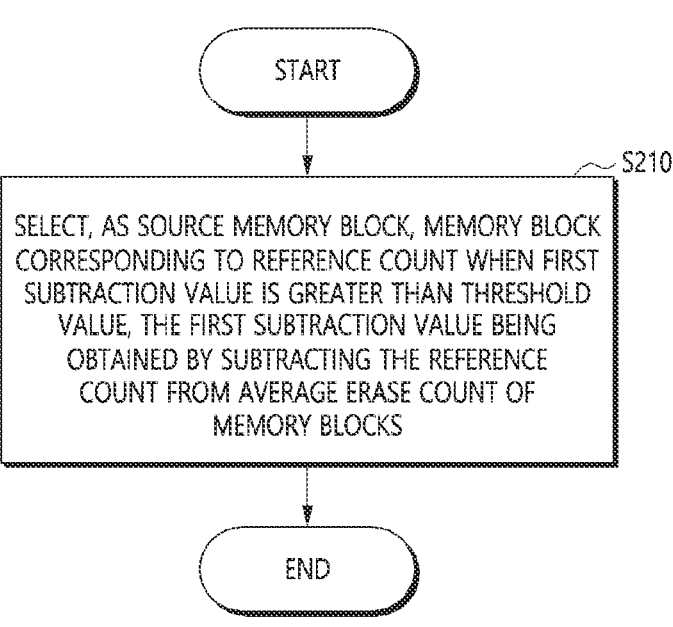

START

~ S210

SELECT, AS SOURCE MEMORY BLOCK, MEMORY BLOCK
CORRESPONDING TO REFERENCE COUNT WHEN FIRST
SUBTRACTION VALUE IS GREATER THAN THRESHOLD
VALUE, THE FIRST SUBTRACTION VALUE BEING
OBTAINED BY SUBTRACTING THE REFERENCE
COUNT FROM AVERAGE ERASE COUNT OF
MEMORY BLOCKS

END

FIG. 5

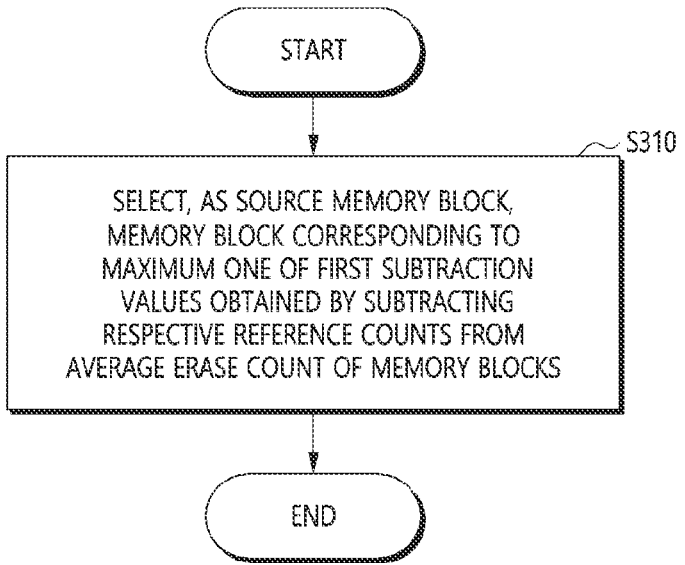

START

~ S310

SELECT, AS SOURCE MEMORY BLOCK,
MEMORY BLOCK CORRESPONDING TO
MAXIMUM ONE OF FIRST SUBTRACTION
VALUES OBTAINED BY SUBTRACTING
RESPECTIVE REFERENCE COUNTS FROM
AVERAGE ERASE COUNT OF MEMORY BLOCKS

END

MEMORY SYSTEM AND OPERATING METHOD OF A CONTROLLER OF THE MEMORY SYSTEM

CROSS-REFERENCES TO RELATED APPLICATION

The present application claims priority under 35 U.S.C. § 119(a) to Korean application number 10-2022-0036096, filed on Mar. 23, 2022, in the Korean Intellectual Property Office, which is incorporated herein by reference in its entirety as set forth in full.

BACKGROUND

1. Technical Field

Various embodiments are related to a memory system, and more particularly, to a memory system including a non-volatile memory device.

2. Related Art

A memory system may be configured to store data provided by a host device in response to a write request from the host device. Furthermore, the memory system may be configured to provide stored data to the host device in response to a read request from the host device. The host device is an electronic device capable of processing data and may include a computer, a digital camera or a mobile phone. The memory system to operate may be mounted in the host device or may be fabricated to be capable of being connected to and detached from the host device.

SUMMARY

In an embodiment, a memory system may include memory blocks and a controller. The controller may be configured to perform a wear levelling operation on the memory blocks based on a reference count table and an erase count table.

In an embodiment, a memory system may include memory blocks and a controller. The controller may be configured to store therein, as a reference count of a corresponding one of the memory blocks, an average erase count of the memory blocks at a first time point and configured to determine whether the corresponding memory block is a cold memory block based on a first subtraction value obtained by subtracting the reference count from the average erase count of the memory blocks at a second time point.

In an embodiment, an operating method of a controller of a memory system may include performing a wear levelling operation on memory blocks based on a reference count table and an erase count table.

BRIEF DESCRIPTION OF THE DRAWINGS

FIG. 4 is a flowchart illustrating an operation of selecting a source memory block in accordance with an embodiment.

FIG. 5 is a flowchart illustrating an operation of selecting a source memory block in accordance with an embodiment.

DETAILED DESCRIPTION

Embodiments of the present disclosure will be described below in more detail with reference to the accompanying drawings. The present disclosure may, however, be embodied in different forms and should not be construed as limited to the embodiments set forth herein.

The drawings are not necessarily to scale and, in some instances, proportions may have been exaggerated in order to clearly illustrate features of the embodiments. The terminology used herein is for the purpose of describing particular embodiments only and is not intended to be limiting of the disclosure.

As used herein, the term "and/or" includes at least one of the associated listed items. It will be understood that when an element is referred to as being "connected to", or "coupled to" another element, it may be directly on, connected to, or coupled to the other element, or one or more intervening elements may be present. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements.

Hereinafter, embodiments of the present disclosure will be described below with reference to the accompanying drawings.

In accordance with an embodiment, provided may be a memory system capable of performing an improved wear levelling operation, and an operating method of a controller of the memory system.

Figure 1:
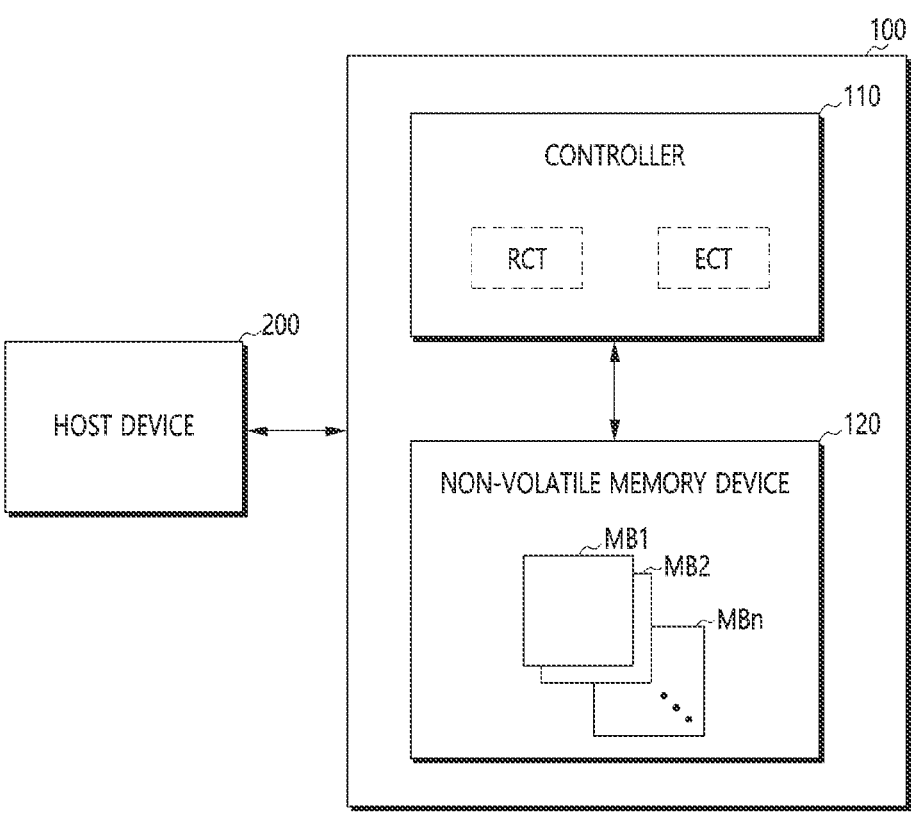
FIG. 1 is a block diagram illustrating a memory system in accordance with an embodiment.

FIG. 1 is a block diagram illustrating a memory system 100 in accordance with an embodiment.

The memory system 100 may be configured to store therein data, which is provided from an external host device 200, in response to a write request from the host device 200. The memory system 100 may be configured to provide the host device 200 with data, which is read therefrom, in response to a read request from the host device 200.

The memory system 100 may be configured as a personal computer memory card international association (PCMCIA) card, a compact flash (CF) card, a smart media card, a memory stick, various multimedia cards (e.g., MMC, eMMC, RS-MMC, and MMC-micro), secure digital (SD) cards (e.g., SD, Mini-SD and Micro-SD), a universal flash storage (UFS) or a solid state drive (SSD).

The memory system 100 may include a controller 110 and a non-volatile memory device 120.

The controller 110 may control an overall operation of the memory system 100. The controller 110 may control the non-volatile memory device 120 in order to perform a foreground operation in response to an instruction from the host device 200. The foreground operation may include operations of writing data in the non-volatile memory device 120 and reading data from the non-volatile memory device 120 in response to instructions from the host device 200, that is, a write request and a read request.

Furthermore, the controller 110 may control the non-volatile memory device 120 in order to perform an internally necessary background operation independently of the host device 200. The background operation may include at least one among a wear-levelling operation, a garbage collection operation, an erase operation, a read reclaim operation and a refresh operation for the non-volatile memory device 120. Like the foreground operation, the background operation may include operations of writing data in the non-volatile memory device 120 and reading data from the non-volatile memory device 120.

The controller 110 may perform a wear levelling operation on memory blocks MB1 to MBn based on a reference count table RCT and an erase count table ECT. The reference count table RCT may include reference counts on the respective memory blocks MB1 to MBn. Each of the reference counts may be an average erase count of the memory blocks MB1 to MBn at a time point of updating the reference count of a corresponding memory block. In an embodiment, the time point of updating the reference count of a corresponding memory block may be a time point when the corresponding memory block becomes open. In an embodiment, the time point of updating the reference count of a corresponding memory block may be a time point when the corresponding memory block becomes erased.

Based on the reference count table RCT and the erase count table ECT, the controller 110 may perform a wear levelling operation by selecting a source memory block and a destination memory block and moving data from the source memory block to the destination memory block.

In an embodiment, during a wear levelling operation, the controller 110 may select, as the source memory block, a memory block corresponding to a reference count, which is included in the reference count table RCT, when a first subtraction value is greater than a threshold value, the first subtraction value being obtained by subtracting the reference count from an average erase count of the memory blocks MB1 to MBn. In an embodiment, during a wear levelling operation, the controller 110 may select, as the source memory block, a memory block corresponding to a maximum one of first subtraction values obtained by subtracting respective reference counts, which are included in the reference count table RCT, from the average erase count of the memory blocks MB1 to MBn.

In an embodiment, during the wear levelling operation, the controller 110 may identify, within the erase count table ECT, erase counts of free memory blocks MB1 to MBn and may select, as the destination memory block, a free memory block having a maximum erase count among the free memory blocks MB1 to MBn.

After completing a wear levelling operation, the controller 110 may perform a subsequent wear levelling operation when a second subtraction value is greater than a threshold value, the second subtraction value being obtained by subtracting an erase count of a source memory block of the completed wear levelling operation from an average erase count of the memory blocks MB1 to MBn.

After completing a wear levelling operation, the controller 110 may perform a subsequent wear levelling operation when a third subtraction value is greater than a threshold value, the third subtraction value being obtained by subtracting an average erase count of the memory blocks MB1 to MBn from an erase count of a destination memory block of the completed wear levelling operation.

Therefore, according to an embodiment, determination of a cold memory block may be performed more precisely and more effectively. Further, in an embodiment, a hot memory block may be prevented or mitigated from being erroneously determined as a cold memory block. Therefore, according to an embodiment, performance of a wear levelling operation may be improved.

Under the control of the controller 110, the non-volatile memory device 120 may store therein data provided from the controller 110 and may read data stored therein to provide the read data to the controller 110. The non-volatile memory device 120 may include the plurality of memory blocks MB1 to MBn. In an embodiment, 'n' may be a number greater than 2.

The non-volatile memory device 120 may include a flash memory device (e.g., the NAND Flash or the NOR Flash), the Ferroelectrics Random Access Memory (FeRAM), the Phase-Change Random Access Memory (PCRAM), the Magnetic Random Access Memory (MRAM), the Resistive Random Access Memory (ReRAM) and so forth.

Figure 2:
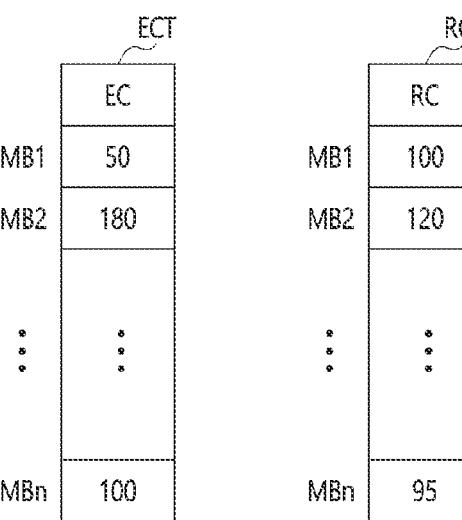
FIG. 2 is a block diagram illustrating an erase count table and a reference count table in accordance with an embodiment.

FIG. 2 is a block diagram illustrating the erase count table ECT and the reference count table RCT in accordance with an embodiment.

Referring to FIG. 2, the erase count table ECT may include erase counts EC of the respective memory blocks MB1 to MBn. Each of the erase counts EC may be a number of times that a corresponding memory block is erased. Each of the erase counts EC may increase by one (1) whenever a corresponding memory block becomes erased. The average erase count of the memory blocks MB1 to MBn may be an average of the erase counts EC within the erase count table ECT. By referring to the erase count table ECT, the controller 110 may calculate the average erase count of the memory blocks MB1 to MBn. The average erase count may increase as time goes by.

The reference count table RCT may include reference counts RC of the respective memory blocks MB1 to MBn. Each of the reference counts RC may be the average erase count of the memory blocks MB1 to MBn at the time point of updating the reference count of a corresponding memory block. Whenever a time point of updating a reference count RC of a memory block has come, the controller 110 may store, as the reference count RC of the memory block and into the reference count table RCT, the average erase count of the memory blocks MB1 to MBn at the time point.

In an embodiment, the time point of updating the reference count of a memory block may be a time point when the memory block becomes open, i.e., a time point when the memory block as a free memory block starts to store data therein. In an embodiment, the time point of updating the reference count of a memory block may be a time point when the memory block becomes erased. Therefore, the reference counts RC may be different from one another within the reference count table RCT.

For example, when opening a first memory block MB1 that is a free memory block, the controller 110 may store, as the reference count RC of the first memory block MB1, the average erase count of the memory blocks MB1 to MBn at that time point. For example, when opening a second memory block MB2 that is a free memory block, the controller 110 may store, as the reference count RC of the second memory block MB2, the average erase count of the memory blocks MB1 to MBn at that time point.

That is, the reference counts RC within the reference count table RCT may be previous values of the average erase count of the memory blocks MB1 to MBn. Therefore, during a wear levelling operation, the controller 110 may identify a cold memory block by comparing the average erase count of the memory blocks MB1 to MBn with the respective reference counts RC within the reference count table RCT. When difference between the average erase count and a reference count RC is great, it is highly probable that data stored in a memory block corresponding to the reference count RC is cold data.

Figure 3:
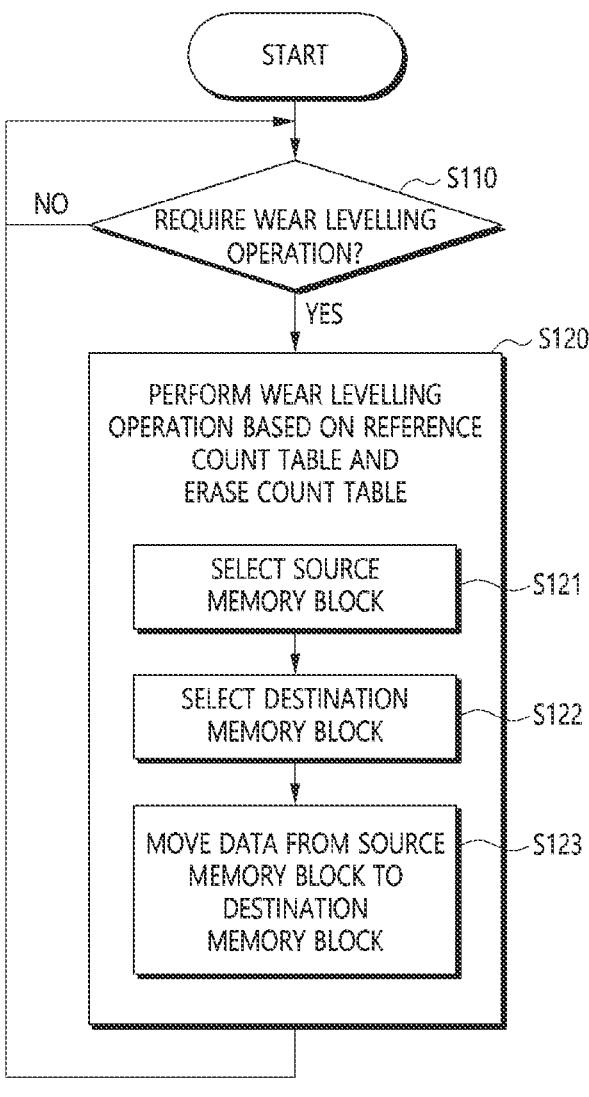
FIG. 3 is a flowchart illustrating an operation of a controller in accordance with an embodiment.

FIG. 3 is a flowchart illustrating an operation of the controller 110 of FIG. 1 in accordance with an embodiment.

Referring to FIG. 3, at step S110, the controller 110 may determine whether a wear levelling operation is required. For example, the controller 110 may determine whether difference between a maximum erase count and an average erase count of the memory blocks MB1 to MBn is greater than a first threshold value. The maximum erase count may be the largest value among erase counts of the memory blocks MB1 to MBn. When the difference between the maximum erase count and the average erase count is not greater than the first threshold value, the process may proceed to step S110. When the difference between the maximum erase count and the average erase count is greater than the first threshold value, the process may proceed to step S120.

At step S120, the controller 110 may perform a wear levelling operation on the memory blocks MB1 to MBn based on the reference count table RCT and the erase count table ECT. Step S120 may include steps S121 to S123.

At step S121, the controller 110 may select a source memory block based on the reference count table RCT and the erase count table ECT. The source memory block may be a cold memory block.

At step S122, the controller 110 may select a destination memory block based on the erase count table ECT. The destination memory block may be a hot memory block.

At step S123, the controller 110 may move data from the source memory block to the destination memory block. Therefore, the destination memory block may store therein cold data from the source memory block. After the wear levelling operation, increase of the erase count of the destination memory block may be suppressed. After step S123, the process may go back to step S110.

FIG. 4 is a flowchart illustrating an operation of selecting the source memory block in accordance with an embodiment. The process illustrated in FIG. 4 may be a detailed embodiment of step S121 of FIG. 3.

Referring to FIG. 4, at step S210, the controller 110 may select, as the source memory block, a memory block corresponding to a reference count, which is included in the reference count table RCT, when a first subtraction value is greater than a second threshold value, the first subtraction value being obtained by subtracting the reference count from the average erase count of the memory blocks MB1 to MBn.

FIG. 5 is a flowchart illustrating an operation of selecting the source memory block in accordance with an embodiment. The process illustrated in FIG. 5 may be a detailed embodiment of step S121 of FIG. 3.

Referring to FIG. 5, at step S310, the controller 110 may select, as the source memory block, a memory block corresponding to a maximum one of first subtraction values obtained by subtracting respective reference counts, which are included in the reference count table RCT, from the average erase count of the memory blocks MB1 to MBn.

Figure 6:
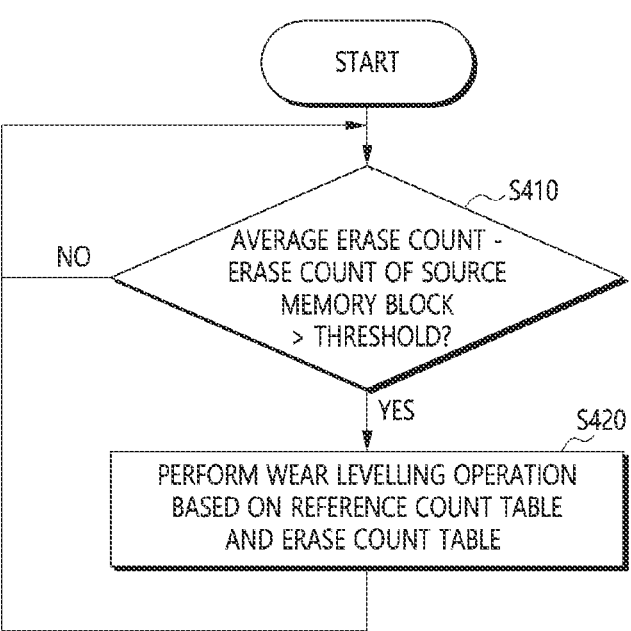
FIG. 6 is a flowchart illustrating an operation of a controller in accordance with an embodiment.

FIG. 6 is a flowchart illustrating an operation of the controller 110 in accordance with an embodiment. In an embodiment, the process illustrated in FIG. 6 may be performed in parallel with the process illustrated in FIG. 3 after step S120 of FIG. 3 is performed at least one time.

Referring to FIG. 6, at step S410, the controller 110 may determine whether a second subtraction value is greater than a third threshold value, the second subtraction value being obtained by subtracting an erase count of the source memory block of the previous wear levelling operation from the average erase count of the memory blocks MB1 to MBn. When the second subtraction value is not greater than the third threshold value, the process may repeat step S410. When the second subtraction value is greater than the third threshold value, the process may proceed to step S420.

At step S420, the controller 110 may perform a wear levelling operation. Step S420 may be performed in a similar way to step S120 of FIG. 3. Then, the process may go back to step S410.

Figure 7:
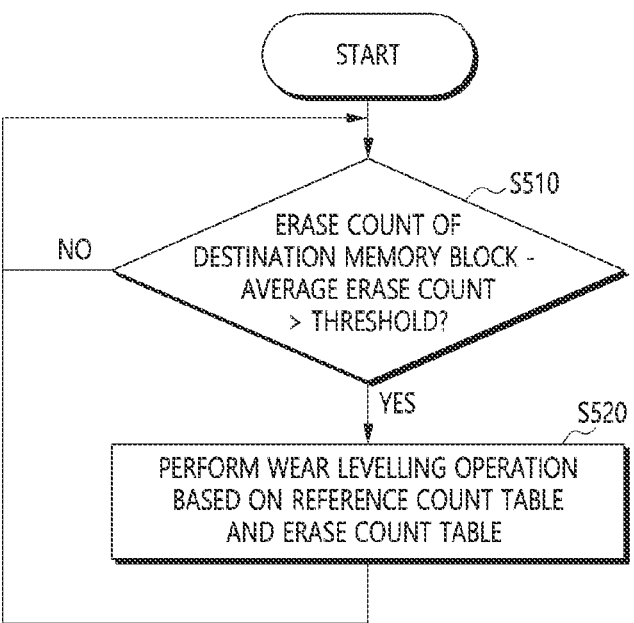
FIG. 7 is a flowchart illustrating an operation of a controller in accordance with an embodiment.

FIG. 7 is a flowchart illustrating an operation of the controller 110 in accordance with an embodiment. In an embodiment, the process illustrated in FIG. 7 may be performed in parallel with the process illustrated in FIG. 3 after step S120 of FIG. 3 is performed at least one time.

Referring to FIG. 7, at step S510, the controller 110 may determine whether a third subtraction value is greater than a fourth threshold value, the third subtraction value being obtained by subtracting an average erase count of the memory blocks MB1 to MBn from an erase count of a destination memory block of a previous wear levelling operation. When the third subtraction value is not greater than the fourth threshold value, the process may repeat step S510. When the third subtraction value is greater than the fourth threshold value, the process may proceed to step S520.

At step S520, the controller 110 may perform a wear levelling operation. Step S520 may be performed in a similar way to step S120 of FIG. 3. Then, the process may go back to step S510.

In accordance with an embodiment, the memory system and the operating method of the controller of the memory system may improve a wear levelling operation.

Figure 8:
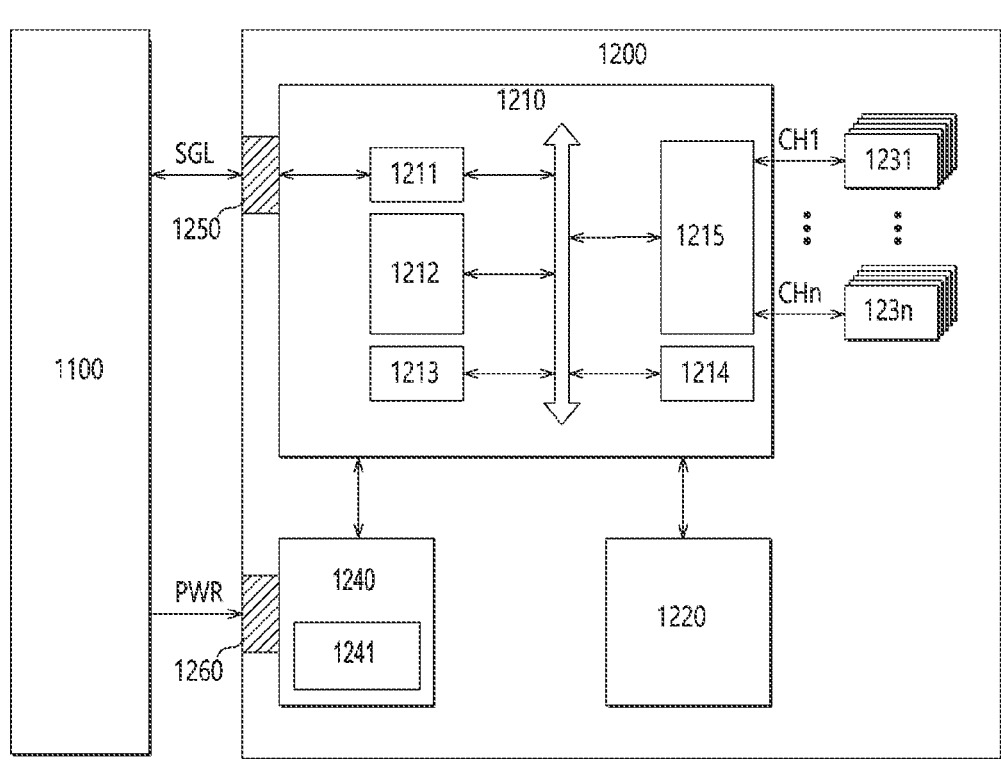
FIG. 8 is a diagram illustrating a data processing system including a solid state drive (SSD) in accordance with an embodiment.

FIG. 8 is a diagram illustrating a data processing system 1000 including a solid state drive (SSD) 1200 in accordance with an embodiment. Referring to FIG. 8, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include the controller 110 shown in FIG. 1. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnect (PCI), PCI express (PCI-E) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 9:
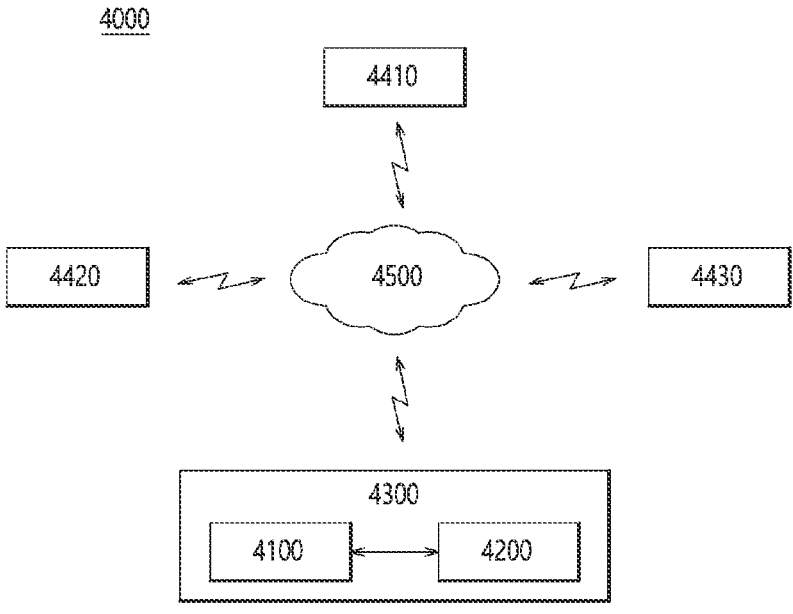
FIG. 9 is a diagram illustrating a network system including a memory system in accordance with an embodiment.

FIG. 9 is a diagram illustrating a network system 4000 including a memory system 4200 in accordance with an embodiment. Referring to FIG. 9, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 10 shown in FIG. 1 or the SSD 1200 shown in FIG. 8.

While certain embodiments have been described above, it will be understood to those skilled in the art that the embodiments described are by way of example only. Accordingly, the memory system and operating method of controller thereof should not be limited based on the described embodiments. Rather, the memory system and operating method of controller thereof described herein should only be limited in light of the claims that follow when taken in conjunction with the above description and accompanying drawings.

What is claimed is:

1. A memory system comprising:
memory blocks; and
a controller configured to perform a wear levelling operation on the memory blocks based on a reference count table and an erase count table,
wherein the reference count table includes reference counts, the number of which is equal to the number of memory blocks, the reference counts being respectively associated with the memory blocks;
wherein the erase count table includes erase counts of the respective memory blocks; and
wherein the controller determines, at a first time point associated with a first memory block among the memory blocks, an average of the erase counts included in the erase count table in order to update a first reference count corresponding to the first memory block, and stores the determined average as the first reference count, the first reference count being not updated even if the average of the erase counts vary until a second time point associated with the first memory block.

2. The memory system of claim 1, wherein the first time point is a time point when the first memory block becomes open.

3. The memory system of claim 1, wherein the first time point is a time point when the first memory block becomes erased.

4. The memory system of claim 1, wherein the controller is configured to perform, based on the reference count table and the erase count table, the wear levelling operation by selecting a source memory block and a destination memory block and moving data from the source memory block to the destination memory block.

5. The memory system of claim 4, wherein, during the wear levelling operation, the controller is configured to select the first memory block as the source memory block when a first subtraction value, obtained by subtracting the first reference count from a current average of the erase counts of the memory blocks, is greater than a threshold value.

6. The memory system of claim 4, wherein, during the wear levelling operation, the controller is configured to select, as the source memory block, the first memory block when a first subtraction value, obtained by subtracting the first reference count from a current average of the erase counts of the memory blocks is a maximum one of subtraction values obtained for the memory blocks by subtracting the respective reference counts from the current average of the erase counts of the memory blocks.

7. The memory system of claim 1, wherein, after completing the wear levelling operation, the controller is configured to perform a subsequent wear levelling operation when a second subtraction value is greater than a threshold value, the second subtraction value being obtained by subtracting an erase count of a source memory block of the completed wear levelling operation from a current average of the erase counts of the memory blocks.

8. The memory system of claim 1, wherein, after completing the wear levelling operation, the controller is configured to perform a subsequent wear levelling operation when a third subtraction value is greater than a threshold value, the third subtraction value being obtained by subtracting a current average of the erase counts of the memory blocks from an erase count of a destination memory block of the completed wear levelling operation.

9. A memory system comprising:
    memory blocks; and
    a controller configured to:
    maintain an erase count table that includes erase counts of the respective memory blocks;
    determine, at a first time point associated with a first memory block among the memory blocks, an average of the erase counts and store the determined average as a first reference count corresponding to the first memory block, the first reference count being not updated even if the average of the erase counts vary until a second time point associated with the first memory block;
    determine the first memory block as a cold memory block based on a first subtraction value obtained by subtracting the first reference count from a current average of the erase counts of the memory blocks; and
    perform a wear levelling operation by moving data from the cold memory block to a hot memory block selected by the controller.

10. The memory system of claim 9, wherein the first time point is a time point when the first memory block becomes open.

11. The memory system of claim 9, wherein the first time point is a time point when the first memory block becomes erased.

12. The memory system of claim 9, wherein the controller determines the first memory block as the cold memory block when the first subtraction value is greater than a threshold value.

13. The memory system of claim 9, wherein, after completing the wear levelling operation, the controller is configured to perform a subsequent wear levelling operation when a second subtraction value is greater than a threshold value, the second subtraction value being obtained by subtracting an erase count of the cold memory block from the then-current average of the erase counts of the memory blocks.

14. The memory system of claim 9, wherein, after completing the wear levelling operation, the controller is configured to perform a subsequent wear levelling operation when a third subtraction value is greater than a threshold value, the third subtraction value being obtained by subtracting the then-current average of the erase counts of the memory blocks from an erase count of the hot memory block.

15. An operating method of a controller of a memory system, the operating method comprising:
    determining, at a first time point associated with a first memory block among memory blocks, an average of erase counts of the respective memory blocks in order to update a first reference count corresponding to the first memory block, and storing the determined average as the first reference count, the first reference count being not updated even if the average of the erase counts vary until a second time point associated with the first memory block; and
    performing a wear levelling operation on memory blocks based on a reference count table and an erase count table,
    wherein the reference count table includes reference counts equal in number to the memory blocks, the reference counts being respectively associated with the memory blocks, and the erase count table includes the erase counts.

16. The operating method of claim 15, wherein the performing of the wear levelling operation includes selecting, as a source memory block, the first memory block when a first subtraction value is greater than a threshold value, the first subtraction value being obtained by subtracting the first reference count from a current average of the erase counts of the memory blocks.

17. The operating method of claim 15, further comprising, after completing the performing of the wear levelling operation, performing a subsequent wear levelling operation when a second subtraction value is greater than a threshold value, the second subtraction value being obtained by subtracting an erase count of a source memory block of the completed wear levelling operation from a current average of the erase counts of the memory blocks.

* * * * *